United States Patent [19]

Bijker et al.

[11] 4,047,108

[45] Sept. 6, 1977

[54] DIGITAL TRANSMISSION SYSTEM FOR TRANSMITTING SPEECH SIGNALS AT A LOW BIT RATE, AND TRANSMISSION FOR USE IN SUCH A SYSTEM

[75] Inventors: Arnold Jan Bijker; Karel Riemens, both of Eindhoven, Netherlands

[73] Assignee: U.S. Philips Corporation, New York, N.Y.

[21] Appl. No.: 594,591

[22] Filed: July 10, 1975

[30] Foreign Application Priority Data

Aug. 12, 1974 Netherlands .......................... 7410763

[51] Int. Cl.² .......................... H04N 7/12; H04B 7/00
[52] U.S. Cl. .................. 325/38 B; 179/15 A; 179/15.55 R; 179/15 BW
[58] Field of Search .................. 325/38 B; 179/15 A, 179/15.55 R, 15 BW; 178/6.8

[56] References Cited

U.S. PATENT DOCUMENTS

| 2,724,740 | 11/1955 | Cutler | 325/38 B |
| 3,521,044 | 7/1970 | Costas | 325/38 B |
| 3,573,364 | 4/1971 | Shimamura | 325/38 B |
| 3,750,024 | 7/1973 | Dunn | 325/38 B |

*Primary Examiner*—Harold Pitts
*Attorney, Agent, or Firm*—Frank R. Trifari; Henry I. Steckler

[57] ABSTRACT

In a digital transmission for low bit rate transfer of speech signals, the frequency information content of the speech signal is transferred via a first transmitter channel and the amplitude information content is transferred via a second transmitter channel. A particularly low bit rate of 4.8 to 7 kbits/second is made possible in that the transmission device in the first transmitter channel is in the form of a uniform delta modulator which is provided with an input circuit which so changes the shape of the speech signal that the input signal to the delta modulator has a constant slope.

10 Claims, 6 Drawing Figures

DIGITAL TRANSMISSION SYSTEM FOR TRANSMITTING SPEECH SIGNALS AT A LOW BIT RATE, AND TRANSMISSION FOR USE IN SUCH A SYSTEM

BACKGROUND OF THE INVENTION

The invention relates to a digital transmission system for transmitting speech signals at a low bit rate and to a transmitter for use in such a system. The transmitter comprises two transmitter channels, and a band-pass filter through which the speech signal to be transmitted is supplied to both said transmitter channels. One of said channels has a first transmission device operating at a given low bit rate for transmitting to the receiver end a first digital signal representative of the frequency information content of the speech signal. The other transmitter channel has an envelope detector, a low-pass filter and a second transmission device operating at an appreciably lower bit rate than said first transmission device for transmitting to the receiver end a second digital signal representative of the amplitude information content of the speech signal. The first and second digital signals are supplied at the receiver end to a receiver having two receiving channels. One of which comprises a decoder which in response to the applied second digital signal produces an output signal corresponding to the envelope of the speech signal, while the other receiving channel includes a pulse modulator, to which the first digital signal and also the envelope signal as a modulating signal are supplied, and an integrator connected to the output of the pulse modulator and from which the recovered initial speech signal is derived via a band-pass filter.

In digital transmission systems the amplitude quantisation is known to give rise to certain deviations between the signal voltage reproduced at the receiver end and the initial signal voltage. These deviations, which produce what is generally referred to as the quantisation noise, are considerable, especially at low bit rates, and they become particularly troublesome with a comparatively low signal voltages or low signal levels.

A digital transmission system of the aforementioned type is described in U.S. Pat. No. 3,518,548.

In this known system a more accurate reproduction and a reduction of the influence of the quantisation noise are obtained by the use of a high degree of comparison. For this purpose in this known system the first transmitter channel is provided with a transmission device which is constituted by a non-uniform pulse delta modulator which transmits the compressed speech signal whilst a parameter which corresponds to the mean slope of the speech signal is transmitted via a second channel having a second encoder which operates at a much lower bit rate than the said non-uniform delta modulator. Thus the bit rate of the system can be reduced to about 10 kbits/second whilst retaining a fairly good transmission quality of the speech signal.

It is an object of the present invention to provide a transmission system of the above-mentioned type which is distinguished by simplicity of construction and moreover enables the bit rate to be further reduced to 4.0 to 7 kbits/second while retaining a reasonably good transmission quality.

SUMMARY OF THE INVENTION

According to the invention such a system is characterized in that in the transmitter the first transmission device is a uniform pulse delta modulator which is provided with an input circuit comprising a differentiator, an amplitude slicer and an integrator through which the band-limited speech signal is supplied to the said uniform delta modulator to generate the said first digital signal.

BRIEF DESCRIPTION OF THE DRAWING

An embodiment of the invention will now be described, by way of example, with reference to the accompanying diagrammatic drawings, in which.

DESCRIPTION OF THE PREFERRED EMBODIMENT

Figure 1:
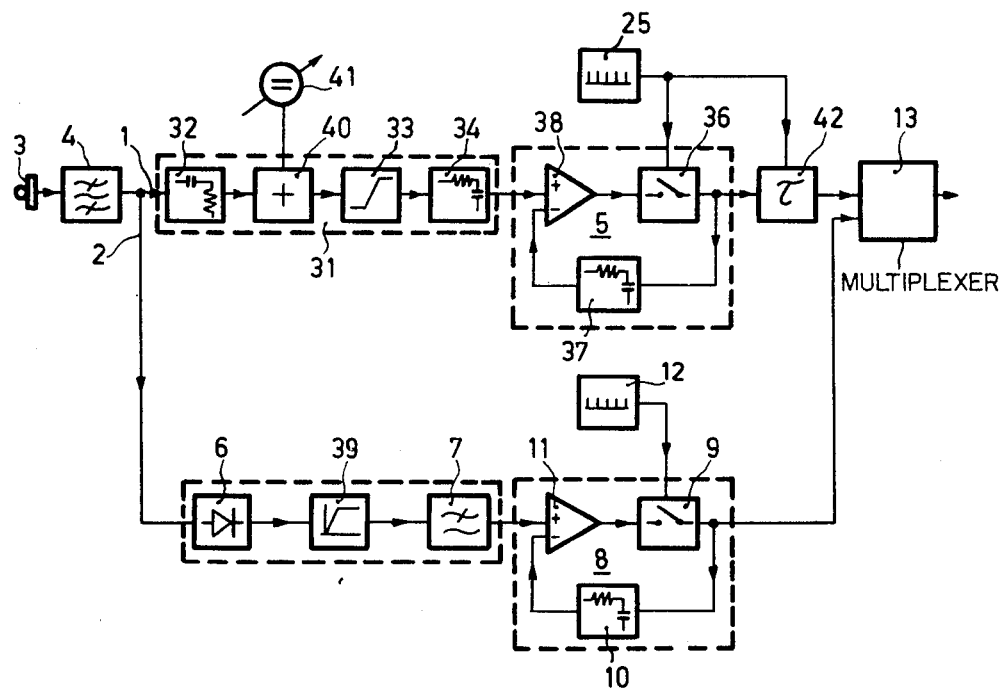
FIG. 1 is a block schematic diagram of an embodiment of the transmitter according to the invention.

Referring now to FIG. 1, the transmitter shown in block schematic form comprises two transmitter channels 1 and 2. To both channels the speech signal is supplied from a microphone 3 through a band-pass filter 4. The transmitter channel 1 includes a first transmission device 5 for transmitting a first digital signal representative of the frequency information content of the speech signal. The other transmitter channel 2 comprises an envelope detector 6, a low-pass filter filter 7 and a second transmission device 8 for transferring to the receiver end a second digital signal representative of the amplitude information content of the speech signal. In the embodiment shown in FIG. 1 the said second transmission device 8 is a uniform pulse delta modulator which is known manner is composed of a decision circuit 9, a local receiver in the form of an integrator 10 connected to the output of the decision circuit 9 and a subtraction device 11 to which the envelope signal which appears at the output of the low-pass filter 7 and also the output signal of the integrator 10 are supplied and the output signal of which is applied to an input of the decision circuit 9. To this decision circuit 9 are also applied the output pulses from a pulse generator 12 which are passed or rejected by the decision circuit, depending upon the sign of the output signal of the subtraction device 11. The bit stream which as a result appears at the output of the pulse delta modulator constitutes the said second digital signal which is representative of the amplitude information content of the speech signal. The two transmitter channels 1 and 2 have their outputs connected to a multiplexer 13 through which the first and second digital signals are transmitted to the receiver end in time division multiplex.

Figure 2:
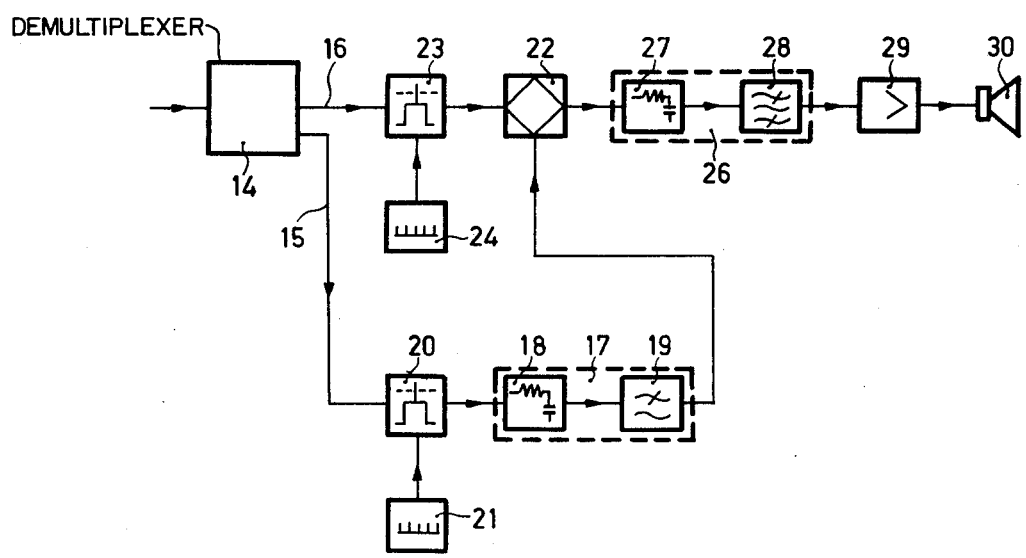
FIG. 2 is a block schematic diagram of an embodiment of a receiver suitable for cooperation with the said transmitter.

FIG. 2 is a block schematic diagram of a receiver for cooperation with the transmitter of FIG. 1. This receiver comprises two receiving channels 15 and 16 connected to a demultiplexer 14. The receiving channel 15 includes a decoder 17 by means of which the received second digital signal is converted into an analogue signal which corresponds to the envelope of the speech signal. More particularly the decoder 17 comprises an integrator 18 and a low-pass filter 19. The second digital signal is supplied to the integrator 18 via a pulse regenerator 20 which is controlled by the output pulses of a pulse generator 21 which in known manner is synchronized with a pulse generator 12 in the trans-
} mitter of FIG. 1. The other receiving channel 16 includes a pulse modulator 22 to which are supplied the first digital signal and also as a modulating signal the envelope signal which appears at the output of low-pass filter 19. In the embodiment of the receiver shown in FIG. 2 the pulse modulator 22 is a pulse amplitude modulator, the first digital signal being applied to this pulse amplitude modulator via a pulse regenerator 23 which is controlled by the output pulses of a pulse generator 24 which in known manner is synchronized with the pulse generator 25 which forms part of the first transmission device 5 of FIG. 1. The receiving channel 16 further comprises a decoder 26 to which are supplied the output pulses of the pulse amplitude modulator 22 which are modulated in amplitude in accordance with the envelope signal. The decoder 26 comprises an integrator 27 and a band-pass filter 28 from which the recovered initial speech signal is derived to be supplied via a low-frequency amplifier 29 to a reproducing device 30.

According to the invention the digital transmission system described so far will be suitable for the transmission of speech signals at a bit rate of 4.8 to 7 kbits/second if in the transmitter (FIG. 1) the first transmission device is a uniform pulse delta modulator which is provided with an input circuit 31 comprising a differentiator 32, an amplitude slicer 33 and an integrator 34 through which the band-limited speech signal is supplied to the said uniform pulse delta modulator 5 for generating the said first digital signal.

Figure 3:
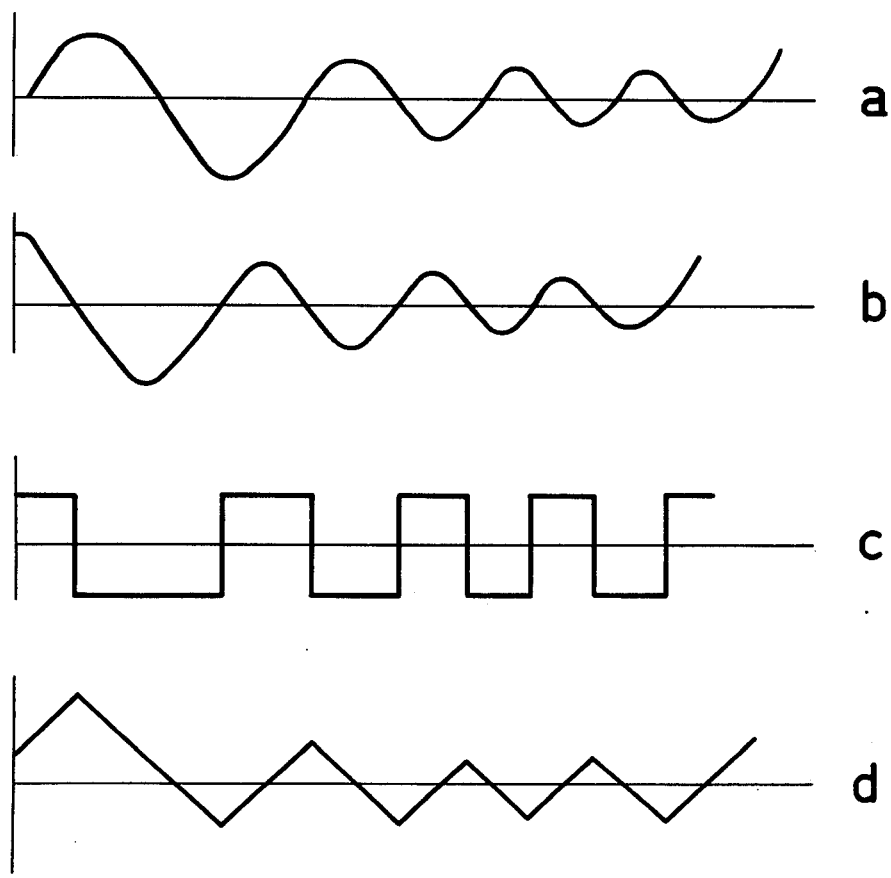
FIGS. 3a, 3b, 3c and 3d show waveforms of signals illustrating the operation of the transmitter.

The differentiator 32 is a network comprising a series branch provided with a capacitor and a parallel branch including a resistor connected to earth. As is known, such a network has the property that the effective current flowing through the network and hence the effective voltage across the resistor is proportional to the frequency of the input signal, which means that the input spectrum is influenced so that for each octave of frequency increase the attenuation introduced is reduced by 6 dB (pre-emphasis). In the embodiment of the transmitter shown in FIG. 1 the band-pass filter 4 has a pass band of 200 to 2700 Hz. The frequency components of the speech frequency spectrum passed by this filter decrease in strength from about 500 Hz towards the higher frequency components by about 6 dB per octave. As the attenuation introduced by the differentiator 32 is reduced by 6dB per octave with increasing frequency, the differentiator 32 effects an equalisation of the speech frequency spectrum such that all the speech frequency components above about 500 Hz occur with about equal strength, whereas the speech frequency components below 500 Hz are reduced in strength. As the frequency information content of the speech signal (important for intelligibility) is given by the positions of the zero crossings of the differential speech signal, there is no objection to rigorously limiting this signal in amplitude by means of the amplitude slicer 33. This slicer may be constructed in known manner and comprises a plurality of successive limiter stages. The output circuit of the slicer 33 is a Schmitt trigger circuit (not shown) to obtain a rectangular output signal. The integrator 34 preferably is not complementary to the differentiator 32 but comprises an RC network which for frequencies higher than 500 Hz produces an attenuation of 6 dB per octave ("3 dB point" 500 Hz). This means that the lower frequencies of the amplitude-limited speech signal are attenuated in a comparatively higher degree, and this proves to be of advantage for the speech signal reproduced at the receiver end. The integrated output signal of the integrator 34 has a triangular waveform. The effect of the operations of differentiating, slicing and integrating is illustrated in FIGS. 3a to 3d in which FIG. 3a shows an input signal to the differentiator 32, FIG. 3b shows the output signal of the differentiator 32 which is applied to the amplitude slicer 33, FIG. 3c shows the rectangular output signal of the slicer 33 which is supplied to the integrator 34, and FIG. 3d shows the triangular signal which appears at the output of the integrator 34.

The output signal of the integrator 34, contains the frequency information content of the speech signal, and this triangular signal is particularly suitable to be simply transmitted by means of a uniform pulse delta modulator at a bit rate which is appreciably lower than that of known systems which, in order to enable the bit rate to be reduced while retaining a reasonably good transmission quality, utilize a non-uniform pulse delta modulation, i.e. a pulse delta modulator including a variable step-size control circuit. For bit rates considerably lower than 10 kbits/second the said known systems cannot be used, because the transmission quality is unacceptable. Extensive investigations have shown that at such low bit rates these known systems have the disadvantage that the control circuit for controlling the step size becomes too slow, so that rapid variations of the input signal are coded either incorrectly or not at all.

In contradistinction thereto the measures according to the invention permit the use of a considerably lower bit rate (of for example 7 to 4.8 kbits/ second) while retaining a reasonably good transmission quality. For, as FIG. 3d shows, the triangular signal which is derived from the integrator 34 and is supplied to the uniform pulse delta modulator 5 always has a constant slope. Therefore, this pulse delta modulator may operate with uniform step size and thus without a special step size control circuit with its disadvantages at low bit rates.

The uniform pulse delta modulator 5 may be constructed in the same manner as the pulse delta modulator 8 in the other transmitter channel 2. Accordingly the pulse delta modulator 5 comprises a decision circuit 36, a local receiver in the form of an integrator 39 connected to the output of the decision circuit 36 and a subtraction device 38 to which the triangular output signal from the integrator 34 and also the output signal from the integrator 37 are supplied and the output signal of which is applied to an input of the decision circuit 36. To this decision circuit 36 are further applied the pulses derived from the pulse generator 25 which are passed or rejected by the decision circuit, depending on the sign of the output signal of the subtraction device 38. The bit stream which as a result appears at the output of the uniform pulse delta modulator 5 constitutes the said first digital signal which is repesentative of the frequency information content of the speech signal to be transmitted.

In a practical embodiment of the transmitter of FIG. 1 in which the pulse generator 25 delivered pulses at a pulse repetition frequency of 4.4 kHz and the pulse generator 12 delivered pulses at a pulse repetition frequency of 0.4 kHz, so that the bit rate of the system was 4.8 kHz, it was found to be of advantage for single integration to be used in the pulse delta modulator 5. The 3dB point of the integrator 37 had been chosen so as to be lower than that of the integrator 34 and to lie at about 300 Hz. This ensures that the modulation index of the delta modulator 5 is frequency-dependent. The signal level of the input of the delta modulator 5 was chosen so that it was fully loaded for low frequencies (and for a direct voltage). This means that the delta modulator 5 was over-loaded by about 4.5 dB for the higher signal frequencies.

Because the envelope signal to be transmitted through the transmitter channel 2 varies in amplitude at a low rate only, a pass band of 0 to 50 Hz is sufficient for the low-pass filter 7. To suppress disturbing peak voltages it was found to be advantageous to insert a unilateral amplitude limiter 39 between the envelope detector 6 and the low-pass filter 7. The delta modulator 8 operates at a very low pulse frequency (400 Hz). It was found advantageous to design the integrator 10 as a double integrator so that the lower frequencies and any direct voltage are transferred with a higher degree of accuracy. Owing to the small bandwidth of the transmitter channel 2 the delay introduced in the channel 2 is greater than that in the channel 1. In order to correct this difference in delay times, which at a bit rate of 4,800 bits/second is about 18 milliseconds, a digital delay circuit 42 is included in the channel 1 between the output of the pulse delta modulator 5 and the input of the multiplexer 13. Such delay circuits are known and may be composed, for example, of one or more register elements which together form a shift register.

In the transmitter of FIG. 1 hitherto described the delta modulator 5 during the intervals in the speech signal delivers the normal rest pattern 1010..., which means that a tone at half of the bit frequency is switched on and off at the beginning and end respectively of each interval or very weak passage in the speech signal. Because a tone at one half of the bit frequency (2,200 Hz) lies within the speech frequency band, this is experienced as troublesome. To avoid this disadvantage in the transmitter shown in FIG. 1 there is inserted between the differentiator 32 and the slicer 33 a summation circuit 40 by means of which a small direct voltage derived from a direct-voltage source 41 is added to the differentiated speech signal. This direct-voltage value may, for example, be 1 to 1.5% of the peak value of the differentiated speech signal. During the intervals in the speech signal this direct voltage appears at the output of the slicer 33 and hence also at the output of the integrator 34, so that the delta modulator 5 during the said intervals does not deliver the normal rest pattern 1010... but delivers the pattern 0000... or 1111.... As a consequence the intervals are silent except for switching effects which do not affect the intelligibility at the receiver end.

Moreover the addition of the said direct voltage increases the simplicity of the system, for, because during the intervals in the speech signal the first transmitter channel 1 transmits only a pulse pattern 1111... and the second channel 2, for example, a pulse pattern 100001000..., the first transmitter channel will on an average transmite more "ones" than the second channel. As a result the transmitter channels are recognizable so that no additional synchronizing pattern need be transmitted.

In order to obtain a higher degree of accuracy when transmitting small signal values, if desired a non-linear network (not shown) may be included in the second transmitter channel 2 between the low-pass filter 7 and the input of the pulse delta modulator 8, provided that a complementary non-linear network is also included in the second transmitter channel 15 between the low-pass filter 19 and the pulse amplitude modulator 22.

Finally it should be mentioned that the invention is not restricted to the aforedescribed embodiment of the transmitter. For example, the uniform pulse delta modulator 8 used in the transmitter channel 2 may if desired be replaced by a "5 bit" pulse code modulator.

What is claimed is:

1. Digital transmission system for transmitting band limited speech signals at a low bit rate, said system comprising a transmitter and a receiver, the transmitter comprising two transmitter channels having a common input means for receiving the speech signal to be transmitted, one of said channels including a first transmission device means operating at a given low bit rate for transmitting to the receiver a first digital signal representative of the frequency information content of the speech signal, the other channel including an envelope detector coupled to said input means, a low-pass filter coupled to said detector, and a second transmission device means coupled to said filter and operating at an appreciably lower bit rate than said first transmission device for transmitting to the receiver a second digital signal representative of the amplitude information content of the speech signal, said receiver comprising input means for receiving and separating said first and second digital signals, two receiving channels coupled to said separating means, one of said channels comprising a decoder means which in response to the applied second digital signal produces an output signal corresponding to the envelope of the speech signal, the other receiving channel comprising a pulse modulator to which the first digital signal and the said envelope signal as a modulating signal are applied, an integrator which is coupled to the output of the pulse modulator, and a band-pass filter coupled to said integrator, said first transmission device means comprising a uniform pulse delta modulator, said transmitter further including a differentiator coupled to said transmitter input means, an amplitude slicer coupled to said differentiator, and an integrator means coupled to said slicer for supplying the band-limited speech signal to said uniform pulse delta modulator for generating said first digital signal.

2. Transmitter for transmitting band limited speech signals comprising two transmitter channels having a common input means for receiving the speech signal, one channel including a first transmission device means for transmitting a first digital signal at a given low bit rate, which first digital signal is representative of the frequency information content of the speech signal, the other channel including an envelope detector coupled to said input means, and a second transmission device means coupled to said detector for transmitting a second digital signal at an appreciably lower bit rate than the said first digital signal, said second digital signal being representative of the amplitude information content of the speech signal, said first transmission device comprising a uniform pulse delta modulator, said transmitter including a differentiator coupled to said input means, an amplitude slicer coupled to said differentiator, and an first integrator means coupled to said slicer for supplying the band-limited speech signal to said uniform pulse delta modulator for generating the said first digital signal.

3. Transmitter as claimed in claim 2, said delta modulator comprising a second integrator, wherein the first integrator has a corner frequency which is higher than the corner frequency of the second integrator.

4. Transmitter as claimed in claim 2, further comprising a summation device means coupled between the differentiator and the amplitude slicer for adding a small direct voltage derived from a direct-voltage source to the differentiated signal.

5. Transmitter as claimed in claim 2, further comprising means for time division multiplexing the digital signals generated in the first and second channels.

6. Transmitter as claimed in claim 5, further comprising a digital delay device means coupled between the output of the waveform pulse delta modulator and said multiplexer means for correcting the difference in delay time between the first and second transmitter channels.

7. Transmitter as claimed in claim 2, wherein the second transmitter channel further includes a unilateral amplitude limiter coupled between said envelope detector and the low-pass filter and through which the amplitude-limited envelope signal is supplied to said second transmission device.

8. Transmitter as claimed in claim 7, wherein said second transmission device comprises a uniform pulse delta modulator.

9. Transmitter as claimed in claim 8, wherein said uniform delta modulator comprises a double integrator.

10. A transmitter as claimed in claim 2, further comprising a bandpass filter coupled to said input means.

* * * * *